Patented Aug. 3, 1926.

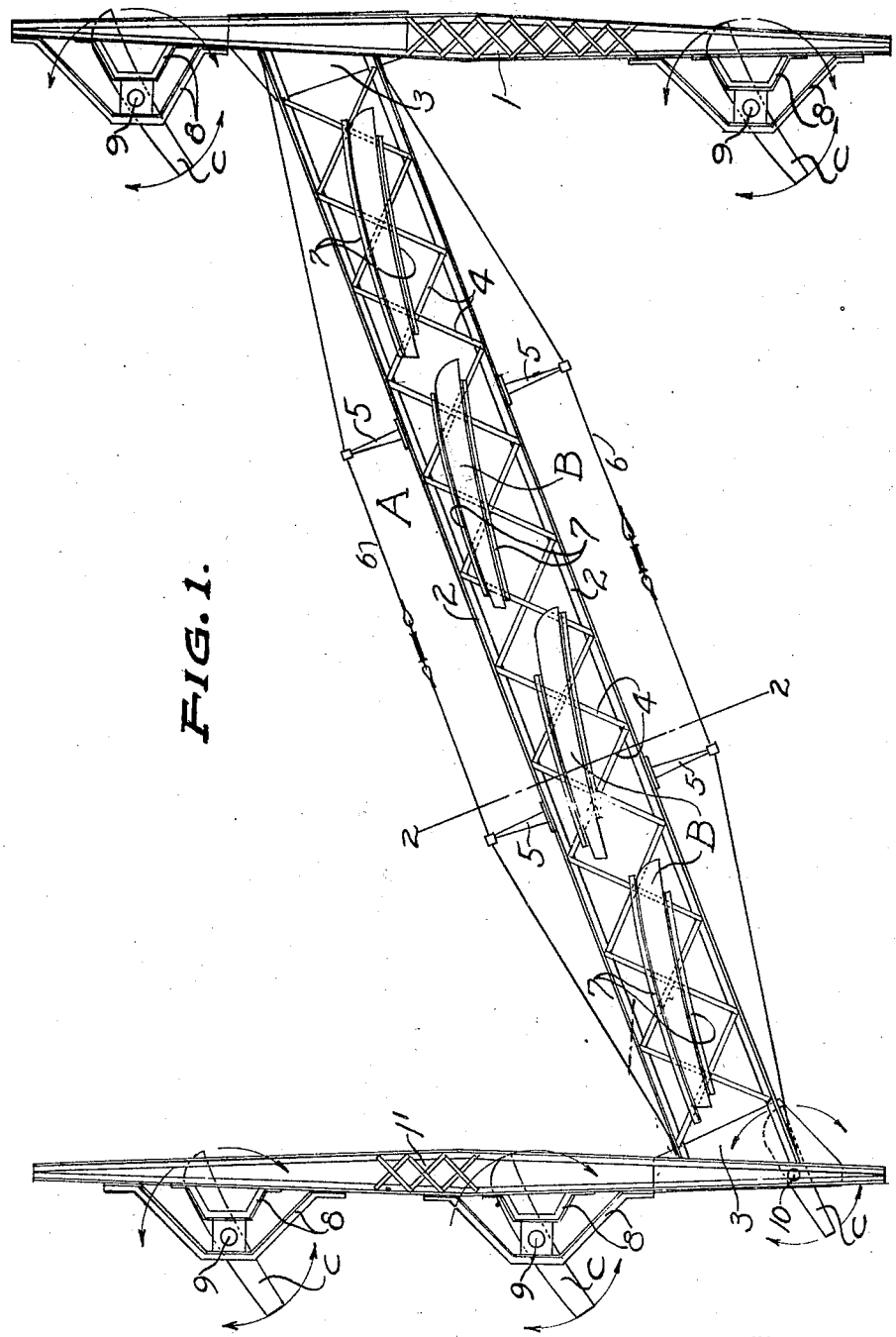

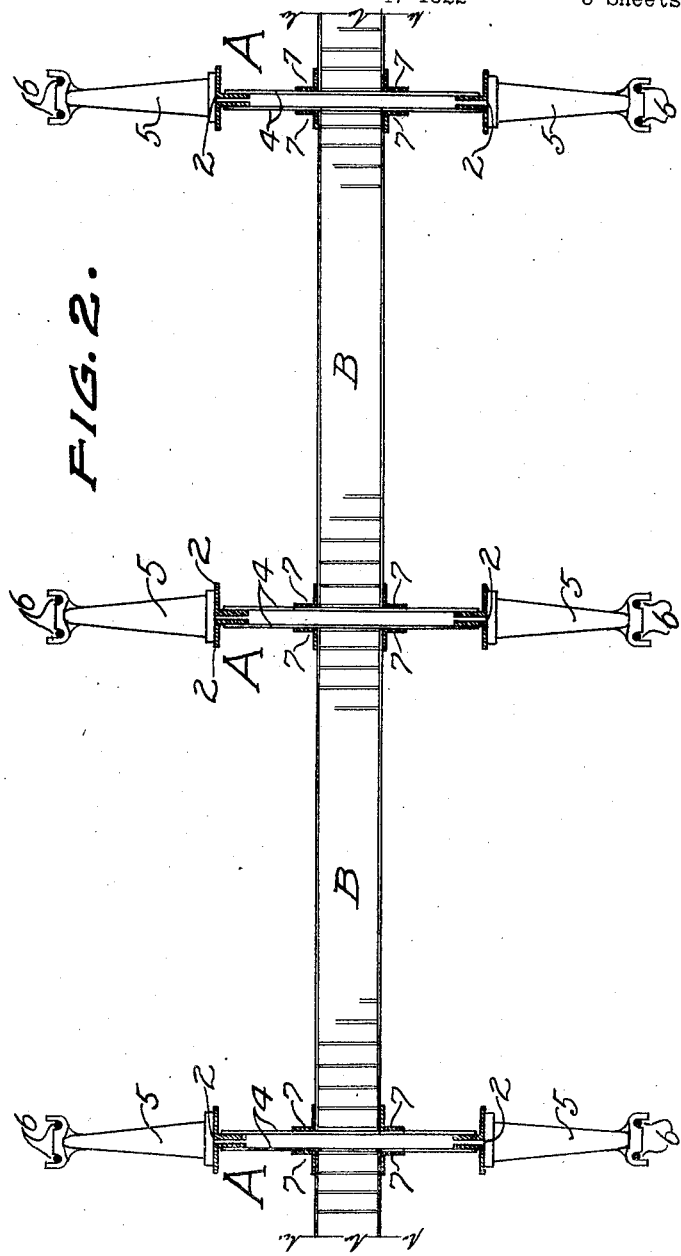

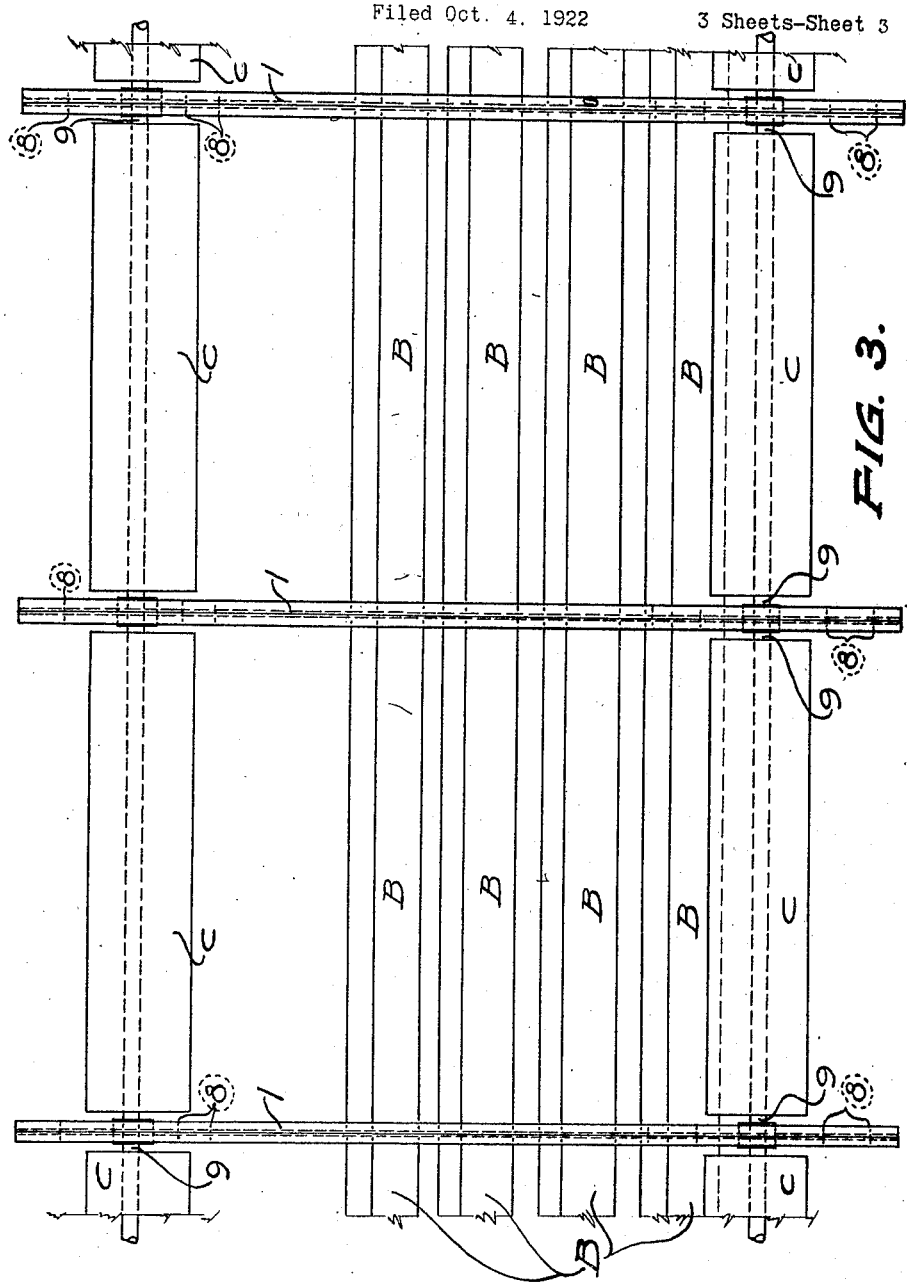

1,594,538

UNITED STATES PATENT OFFICE.

ARCHIBALD LEE McKELVEY, OF ST. LOUIS, MISSOURI.

AIRCRAFT.

Application filed October 4, 1922. Serial No. 592,379.

This invention relates generally to aircraft and, more particularly, to a certain new and useful improvement in aircraft of the type shown and described in United States Letters Patent No. 1,187,916, issued to me June 20, 1916.

My present invention has for its object to improve generally upon some of the wing-structures of the craft and resides in the novel features of form, construction, arrangement, and combination of parts hereinafter described and afterwards pointed out in the claims.

In the accompanying drawings,

Figure 1 is a fragmental side elevational view of an aircraft equipped with sustaining and elevating wing-structures embodying my invention;

Figure 2 is a transverse sectional view of the wing-structures taken approximately on the line 2—2, Figure 1; and Figure 3 is a front elevational view of the wing-structures of Figure 1.

Referring now more in detail and by reference characters to the accompanying drawings, which illustrate a preferred embodiment of my invention, the craft as a whole, while not here shown, but as fully shown and described in said Letters Patent No. 1,187,916, is built upon and includes a pair of substantially rigid elongated body-frames disposed vertically transversely of the craft and rigidly fixed together in spaced approximately parallel relation, each frame being of truss construction and comprising upper and lower chords fixed together at their ends. Disposed vertically within each body-truss or frame and in spaced relation transversely of the craft, are upright braces or struts, and supported by the body-frames and disposed longitudinally and centrally of the craft, is a so-called hull or passenger carriage.

In the present drawings, 1—1' indicate the upright braces or struts of the forward and rearward body-frames or trusses of the craft, of which struts there may be any desired number within the dimensions of the particular craft and its body-frames, the present struts 1—1' being preferably of rigid laced so-called girder type, as best seen in Figure 1.

Disposed, and extending longitudinally of the craft obliquely upwardly and forwardly, between each pair of the struts 1—1', is a wing-truss A formed of upper and lower members or chords 2—2 spaced vertically and each composed preferably of two standard angles placed back to back and each being rigidly fixed at its ends, as by gusset-plates or the like 3, to the struts 1—1', as also best seen in Figure 1. Disposed between and strengthening the chords or truss-members 2—2, is lacing composed of oppositely disposed pairs of diagonally or obliquely extending brace-strips 4—4 engaging at their ends with and riveted or otherwise rigidly fixed to the truss-member 2—2, as best seen in Figures 1 and 2. Extending outwardly, upwardly and downwardly, from the respective truss-members 2, is a plurality of pairs of posts or struts 5—5, and engaging at their ends with the members 2 and intermediate their ends with the respective struts 5, as best seen in Figure 1, are tension members 6 preferably in the form of metallic bars or cables.

Disposed lengthwise transversely of the craft between each two of the trusses A, and suitably fastened, as by angles 7, to the interior brace-members 4 of the respective trusses A, as best seen in Figure 2, is a plurality of individual lifting- and sustaining wings B, which may each be of any approved or standard form and construction, and which said wings B are disposed vertically in different planes one above the other or, as I may say, in a spaced stepped series, whereby free air spaces are provided between the several wings of the series, each wing B having preferably a fixed angle of incidence and each having preferably greater length than breadth, substantially as shown.

Each two trusses A and the wings B disposed in a so-called stepped series therebetween and fixed thereto, as described, constitute or form what I may designate as a wing-unit, and of such units it will be understood that the craft may comprise any desired number. In the present instance, I have shown but two such units, an intermediate truss A being common to two adjacent or adjoining units, as best seen in Figure 2, and the several wings B of one unit being in alignment end to end with the several respective wings B of the other wing-units of the craft.

By such construction, I provide a rigid support of great strength for the wings B, and, at the same time, the air currents are permitted to freely, directly, and unobstructively act upon both surfaces of each of the wings B in both the lifting of the craft and in sustaining the craft in flight.

Extending lengthwise transversely of the craft and mounted for rotatory movement in suitable rigid bracket-bearings 8 provided on the main struts 1—1' of the craft, as best seen in Figure 1, are shafts 9; and disposed lengthwise transversely of the craft and suitably fixed in spaced end to end relation on each respective shaft 9 for simultaneous oscillatory movement when such shaft is rotarily actuated, is a series of so-called elevating wings C of likewise any suitable or approved form and construction. Of the sets or series of elevating-wings C, the craft may also have any desired number, an additional set of such wings C being here shown as disposed upon a shaft 10 extending likewise transversely of the craft, but mounted for rotatory movement directly upon the several main struts 1'. It will be evident that, as the several respective shafts 9—10 are rotarily actuated, the sets of wings C carried thereon will be correspondingly oscillated in the elevating or lowering of the craft either for ascending or descending.

I am aware that changes in the form, construction, arrangement, and combination of the several parts of my new aircraft-wings-structure may be made and substituted for those herein shown and described without departing from the nature and principle of my invention.

Having thus described my invention, what I claim and desire to secure by Letters Patent is:

1. In an aircraft, a rigid wing supporting truss disposed lengthwise longitudinally of the craft and comprising upper and lower chords fixed together at their ends, spaced struts projecting outwardly, upwardly and downwardly from the respective chords, and tension members having engagement at their ends with the chords and intermediate their ends with the struts.

2. In an aircraft, a rigid wing supporting truss disposed lengthwise longitudinally of the craft and comprising upper and lower chords fixed together at their ends, spaced struts projecting outwardly, upwardly and downwardly from the respective chords, tension members having engagement at their ends with the chords and intermediate their ends with the struts, and diagonal brace-members disposed between and fixed at their ends to the chords.

3. In an aircraft, a pair of fixed uprights spaced longitudinally of the craft, a rigid wing supporting truss extending obliquely upwardly and forwardly longitudinally of the craft and comprising upper and lower chords fixed at their ends to said uprights, spaced struts projecting outwardly, upwardly and downwardly from the respective chords, tension members having engagement at their ends with the chords and intermediate their ends with the struts, and diagonal brace members disposed in the plane of and fixed at their ends to the chords.

4. In an aircraft, a first pair of fixed uprights spaced transversely of the craft, a second pair of fixed uprights also spaced transversely of the craft and disposed in parallel relation to, and in the respective vertical planes of, the uprights of the first pair, said first and second uprights being spaced longitudinally of the craft, a pair of parallel trusses extending longitudinally, and spaced transversely, of the craft, said trusses being disposed vertically in the respective vertical planes of, and, respectively, fixed at their ends to, uprights of said first and second pairs, and a wing disposed lengthwise transversely of the craft intermediate and supported by said trusses.

5. In an aircraft, a first pair of fixed uprights spaced transversely of the craft, a second pair of fixed uprights also spaced transversely of the craft and disposed in parallel relation to, and in the respective vertical planes of, the uprights of the first pair, said first and second uprights being spaced longitudinally of the craft, a pair of parallel trusses extending longitudinally, and spaced transversely, of the craft and respectively, fixed at their ends to uprights of said first and second pairs, and a plurality of individual wings each disposed lengthwise transversely of the craft between and supported by said trusses.

6. In an aircraft, a first pair of fixed uprights spaced transversely of the craft, a second pair of fixed uprights also spaced transversely of the craft and disposed in parallel relation to, and in the respective vertical planes of, the uprights of the first pair, said first and second uprights being spaced longitudinally of the craft, a pair of parallel trusses extending obliquely upwardly and forwardly longitudinally, and spaced transversely, of the craft and respectively fixed at their ends to uprights of said first and second pairs, and a plurality of wings disposed lengthwise transversely of the craft and in a spaced stepped series between and supported by said trusses.

7. In an aircraft, a first pair of fixed uprights spaced transversely of the craft, a second pair of fixed uprights also spaced transversely of the craft and disposed in parallel relation to, and in the respective vertical planes of, the uprights of the first pair, said first and second uprights being spaced longitudinally of the craft, a pair of parallel trusses extending obliquely upwardly and forwardly longitudinally, and spaced transversely, of the craft and respectively fixed at their ends to uprights of said first and second pairs, and a wing disposed lengthwise transversely of the craft and between and supported for oscillation by said trusses.

8. An aircraft including a plurality of pairs of fixed uprights, the pairs of uprights being spaced transversely and the uprights of each pair being spaced longitudinally of the craft, a plurality of trusses extending obliquely upwardly and forwardly longitudinally of the craft and respectively rigidly fixed at their ends to the uprights of a respective pair, and a plurality of sets of wings, each set being disposed transversely of the craft in a spaced stepped series between and rigidly fixed to adjacent trusses.

In testimony whereof, I have signed my name to this specification.

ARCHIBALD LEE McKELVEY.